United States Patent
Wang et al.

(10) Patent No.: US 11,700,627 B2
(45) Date of Patent: Jul. 11, 2023

(54) GROUP SEMI-PERSISTENT SCHEDULING FOR PATH DIVERSITY

(71) Applicant: QUALCOMM Incorporated, San Diego, CA (US)

(72) Inventors: Hua Wang, Basking Ridge, NJ (US); Piyush Gupta, Bridgewater, NJ (US); Junyi Li, Chester, NJ (US); Lik Hang Silas Fong, Bridgewater, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 119 days.

(21) Appl. No.: 17/087,974

(22) Filed: Nov. 3, 2020

(65) Prior Publication Data

US 2021/0136792 A1    May 6, 2021

Related U.S. Application Data

(60) Provisional application No. 62/930,939, filed on Nov. 5, 2019.

(51) Int. Cl.
*H04W 4/08* (2009.01)
*H04W 72/50* (2023.01)
(Continued)

(52) U.S. Cl.
CPC ......... *H04W 72/535* (2023.01); *H04L 5/0055* (2013.01); *H04W 24/08* (2013.01);
(Continued)

(58) Field of Classification Search
None
See application file for complete search history.

(56) References Cited

U.S. PATENT DOCUMENTS

| | | | |
|---|---|---|---|
| 10,750,521 B2 * | 8/2020 | Lee | H04W 4/40 |
| 11,129,173 B2 * | 9/2021 | Kim | H04W 72/121 |

(Continued)

FOREIGN PATENT DOCUMENTS

| | | | |
|---|---|---|---|
| EP | 2658330 A1 | 10/2013 | |
| WO | 2013131264 A1 | 9/2013 | |
| WO | WO-2013131264 A1 * | 9/2013 | H04W 72/04 |

OTHER PUBLICATIONS

Co-Pending U.S. Appl. No. 16/998,687, inventor WANG; Hua, filed Aug. 20, 2020.

(Continued)

*Primary Examiner* — Sithu Ko
(74) *Attorney, Agent, or Firm* — Patterson + Sheridan, L.L.P.

(57) ABSTRACT

Certain aspects of the present disclosure provide techniques for group semi-persistent scheduling (SPS) for path diversity. A method that may be performed by a node includes configuring one or more groups of user equipments (UEs) with one or more SPS resources. The node sends a downlink control information (DCI) to activate one of the SPS resources for one of the groups of UEs and transmits data to the group of UEs using the activated SPS resource. A first UE may receive data from the node using the activated SPS resource and retransmit the data to the second UE. The first helping UE and the second targeted UE may be identified based on the higher layer configuration with the SPS resources, based on information in the DCI, and/or based on information sent with the data.

18 Claims, 12 Drawing Sheets

(51) Int. Cl.
    *H04W 76/27*     (2018.01)
    *H04W 24/08*     (2009.01)
    *H04W 76/11*     (2018.01)
    *H04L 5/00*     (2006.01)
    *H04W 76/30*     (2018.01)
    *H04W 72/121*     (2023.01)
    *H04W 72/23*     (2023.01)

(52) U.S. Cl.
    CPC ......... *H04W 72/121* (2013.01); *H04W 72/23* (2023.01); *H04W 76/11* (2018.02); *H04W 76/27* (2018.02); *H04W 76/30* (2018.02)

(56) References Cited

U.S. PATENT DOCUMENTS

| | | | | |
|---|---|---|---|---|
| 11,191,074 | B2 * | 11/2021 | Choi | H04W 72/23 |
| 11,375,498 | B2 * | 6/2022 | Zhao | H04W 4/46 |
| 2013/0301582 | A1 * | 11/2013 | Jiang | H04W 72/23 |
| | | | | 370/329 |
| 2014/0003319 | A1 * | 1/2014 | Etemad | H04W 48/12 |
| | | | | 370/312 |
| 2014/0177542 | A1 | 6/2014 | Novak et al. | |
| 2018/0184439 | A1 * | 6/2018 | Lee | H04W 72/042 |
| 2019/0223206 | A1 * | 7/2019 | Gupta | H04L 1/0003 |
| 2020/0092685 | A1 * | 3/2020 | Fehrenbach | H04W 4/46 |
| 2020/0280977 | A1 * | 9/2020 | Chen | H04W 4/70 |
| 2021/0045093 | A1 * | 2/2021 | Rao | H04W 36/0009 |
| 2021/0219268 | A1 * | 7/2021 | Li | H04L 1/1887 |
| 2021/0219269 | A1 * | 7/2021 | Lee | H04W 28/0289 |
| 2021/0314991 | A1 * | 10/2021 | Tenny | H04W 4/40 |
| 2021/0377993 | A1 * | 12/2021 | Ayaz | H04W 76/14 |
| 2022/0007403 | A1 * | 1/2022 | Li | H04W 72/1289 |

OTHER PUBLICATIONS

Co-Pending U.S. Appl. No. 17/074,037, filed Oct. 19, 2020.
International Search Report and Written Opinion—PCT/US2020/058827—ISA/EPO—dated Jan. 25, 2021.
Co-Pending U.S. Appl. No. 17/088,138, inventor FONG; Lik Hang Silas, filed Nov. 3, 2020.

\* cited by examiner

GROUP SEMI-PERSISTENT SCHEDULING FOR PATH DIVERSITY

CROSS-REFERENCE TO RELATED APPLICATION(S)

This application claims benefit of and priority to U.S. Provisional Application No. 62/930,939, filed Nov. 5, 2019, which is hereby assigned to the assignee hereof and hereby expressly incorporated by reference herein in its entirety as if fully set forth below and for all applicable purposes.

INTRODUCTION

Aspects of the present disclosure relate to wireless communications, and more particularly, to techniques for access link and sidelink communications.

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include path diversity with group semi-persistent scheduling (SPS).

One or more aspects of the disclosure can be implemented in a method for wireless communication by a node. The method generally includes configuring one or more groups of user equipments (UEs) with one or more SPS resources. The method generally includes sending a downlink control information (DCI) to activate one of the SPS resources for one of the groups of UEs. The method generally includes transmitting data to the group of UEs using the activated SPS resource.

One or more aspects of the disclosure can be implemented in a method for wireless communication by a first UE. The method generally includes receiving a configuration of one or more SPS resources for a group of UEs including the first UE and a second UE. The method generally includes receiving a DCI from a node activating one of the one or more SPS resources. The method generally includes receiving data from the node using the activated SPS resource.

One or more aspects of the disclosure can be implemented in a method for wireless communication by a second UE. The method generally includes receiving a configuration of one or more SPS resources for a group of UEs including the second UE and a first UE. The method generally includes monitoring the one or more SPS resources for a data transmission from a base station (BS).

One or more aspects of the disclosure can be implemented in an apparatus for wireless communication. The apparatus generally includes a memory and at least one processor coupled with the memory. The memory and processor are configured to configure one or more groups of UEs with one or more SPS resources; send a DCI to activate one of the SPS resources for one of the groups of UEs; and transmit data to the group of UEs using the activated SPS resource.

One or more aspects of the disclosure can be implemented in a first apparatus for wireless communication. The first apparatus generally includes a memory and at least one processor coupled with the memory. The memory and processor are configured to receive a configuration of one or more SPS resources for a group of apparatuses including the first apparatus and a second apparatus; receive a DCI from a node activating one of the one or more SPS resources; and receive data from the node using the activated SPS resource.

One or more aspects of the disclosure can be implemented in a second apparatus for wireless communication. The second apparatus generally includes a memory and at least one processor coupled with the memory. The memory and processor are configured to receive a configuration of one or more SPS resources for a group of apparatuses including the second apparatus and a first apparatus; and monitoring the one or more SPS resources for a data transmission from a BS.

One or more aspects of the disclosure can be implemented in an apparatus for wireless communication. The apparatus generally includes means for configuring one or more groups of UEs with one or more SPS resources; means for send a DCI to activate one of the SPS resources for one of the groups of UEs; and means for transmitting data to the group of UEs using the activated SPS resource.

One or more aspects of the disclosure can be implemented in a first apparatus for wireless communication. The first apparatus generally includes means for receiving a configuration of one or more SPS resources for a group of apparatuses including the first apparatus and a second apparatus; means for receiving a DCI from a node activating one of the one or more SPS resources; and means for receiving data from the node using the activated SPS resource.

One or more aspects of the disclosure can be implemented in a second apparatus for wireless communication. The second apparatus generally includes means for receiving a configuration of one or more SPS resources for a group of apparatuses including the second apparatus and a first apparatus; and means for monitoring the one or more SPS resources for a data transmission from a BS.

One or more aspects of the disclosure can be implemented in a computer readable medium storing computer executable code thereon for wireless communication. The computer readable medium generally includes code configuring one or more groups of UEs with one or more SPS resources; code for sending a DCI to activate one of the SPS resources for one of the groups of UEs; and code for transmitting data to the group of UEs using the activated SPS resource.

One or more aspects of the disclosure can be implemented in a computer readable medium storing computer executable code thereon for wireless communication. The computer readable medium generally includes code for receiving a configuration of one or more SPS resources for a group of UEs including a first UE and a second UE; code for receiving a DCI from a node activating one of the one or more SPS resources; and code for receiving data from the node using the activated SPS resource.

One or more aspects of the disclosure can be implemented in a computer readable medium storing computer executable code thereon for wireless communication. The computer readable medium generally includes code receiving a configuration of one or more SPS resources for a group of UEs including a second UE and a first UE; and code for monitoring the one or more SPS resources for a data transmission from a BS.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
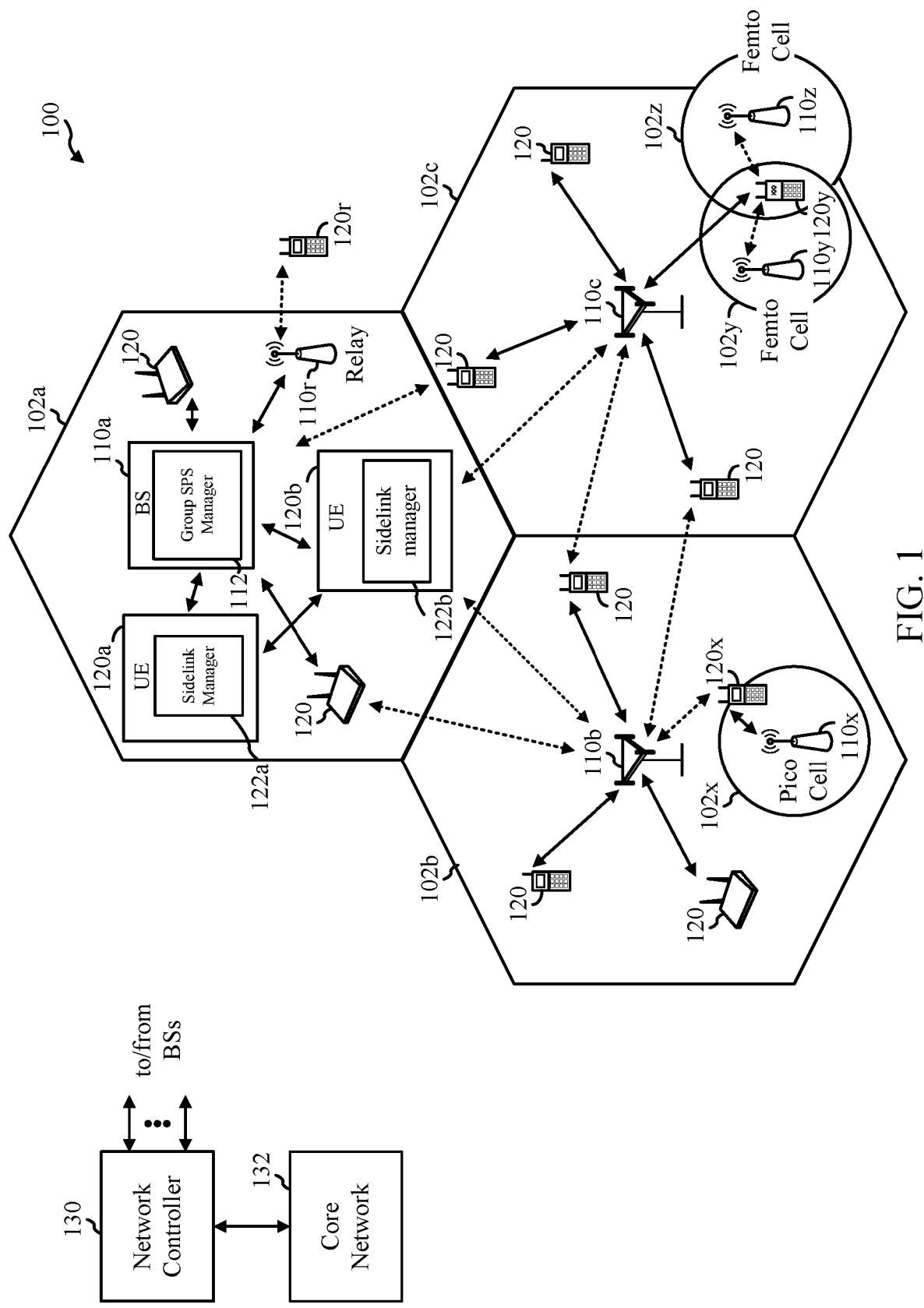
FIG. 1 is a block diagram conceptually illustrating an example telecommunications system, in accordance with certain aspects of the present disclosure.

Aspects of the present disclosure provide apparatus, methods, processing systems, and computer readable mediums for group semi-persistent scheduling (SPS).

Certain wireless communication systems (e.g., 5G new radio (NR)) employ sidelink communications between devices. In general, sidelink communications may include communications between two or more subordinate wireless communication devices (e.g., user equipments (UEs)) in a wireless communication network, without the two or more subordinate wireless communication devices needing to communicate via another network entity (e.g., a base station (BS)). Sidelink communications may allow path diversity and extended coverage. For example, in some cases, downlink transmission on a direct link between a BS and a UE, or a sidelink between a programmable logical controller (PLC) and a UE, can become blocked. Blockage of the link may cause radio link failure, beam failure, and/or transmission failure. Accordingly, in certain aspects, a sidelink may be used for retransmission of downlink data to a UE that did not receive the initial data transmission from the BS or PLC. A first UE (e.g., referred to herein as a helper UE) can retransmit the data from the BS or PLC to a second UE (e.g., referred to herein as a target UE) that did not receive the data. This sidelink may provide a communication path between the target UE and the BS or PLC via the helper UE, even when the direct link between the target UE and the BS or PLC is blocked.

In order to enable such a communication path, via a first UE, between the BS or PLC and the second UE, aspects of the present disclosure provide techniques and apparatus for scheduling communication along such a communication path. In particular, certain aspects of the present disclosure provide techniques and apparatus for group SPS for scheduling a downlink data transmission to a group of UEs. For example, a common SPS resource can be radio resource control (RRC) configured with a group identifier (ID). Downlink control information (DCI) carrying the group ID can be used to activate the common SPS resource for the UEs associated with the group ID, so that the UEs can monitor for downlink data from the BS. Aspects of the present disclosure provide techniques and apparatus for identifying the targeted UEs of the downlink data from the BS and for identifying the first UEs (e.g., helper UEs) that retransmit the data to the second UEs (e.g., the target UEs). In some examples, the DCI also indicates the second UE IDs to the first UEs. In some examples, the first UE IDs and second UE IDs are RRC configured. In some examples, the first UE IDs are RRC configured, and the second UE IDs are sent in the DCI or with the initial data transmission. Aspects of the present disclosure also provide techniques and apparatus for updating the common SPS resource.

The following description provides examples of group SPS for path diversity in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110a-z (each also individually referred to herein as BS 110 or collectively as BSs 110) and/or user equipment (UE) 120a-y (each also individually referred to herein as UE 120 or collectively as UEs 120) in the wireless communication network 100 via one or more interfaces.

A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110. The network controller 130 may communicate with the BSs 110 via a backhaul.

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may be in communication with a set of BSs 110 and provide coordination and control for these BSs 110 (e.g., via a backhaul). In aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

According to certain aspects, the BSs 110 and UEs 120 may be configured for group SPS. As shown in FIG. 1, the BS 110a includes a Group SPS manager 112. The Group SPS manager 112 may configure the UE 120a and UE 120b with a common SPS resource and send DCI to activate the resource, in accordance with aspects of the present disclosure. As shown in FIG. 1, the UE 120a includes a sidelink manager 122a. The sidelink manager 122a may be configured to receive common SPS resource configuring, DCI, and an initial data transmission from the BS 110a and to retransmit the data to the UE 120b, in accordance with aspects of the present disclosure. As shown in FIG. 1, the UE 120b includes a sidelink manager 122b. The sidelink manager 122b may be configured to receive a group SPS configuration from the BSs 110a; monitor the SPS resources for a data transmission from the BS 110a; and to receive a retransmission from the UE 120a.

Figure 2:
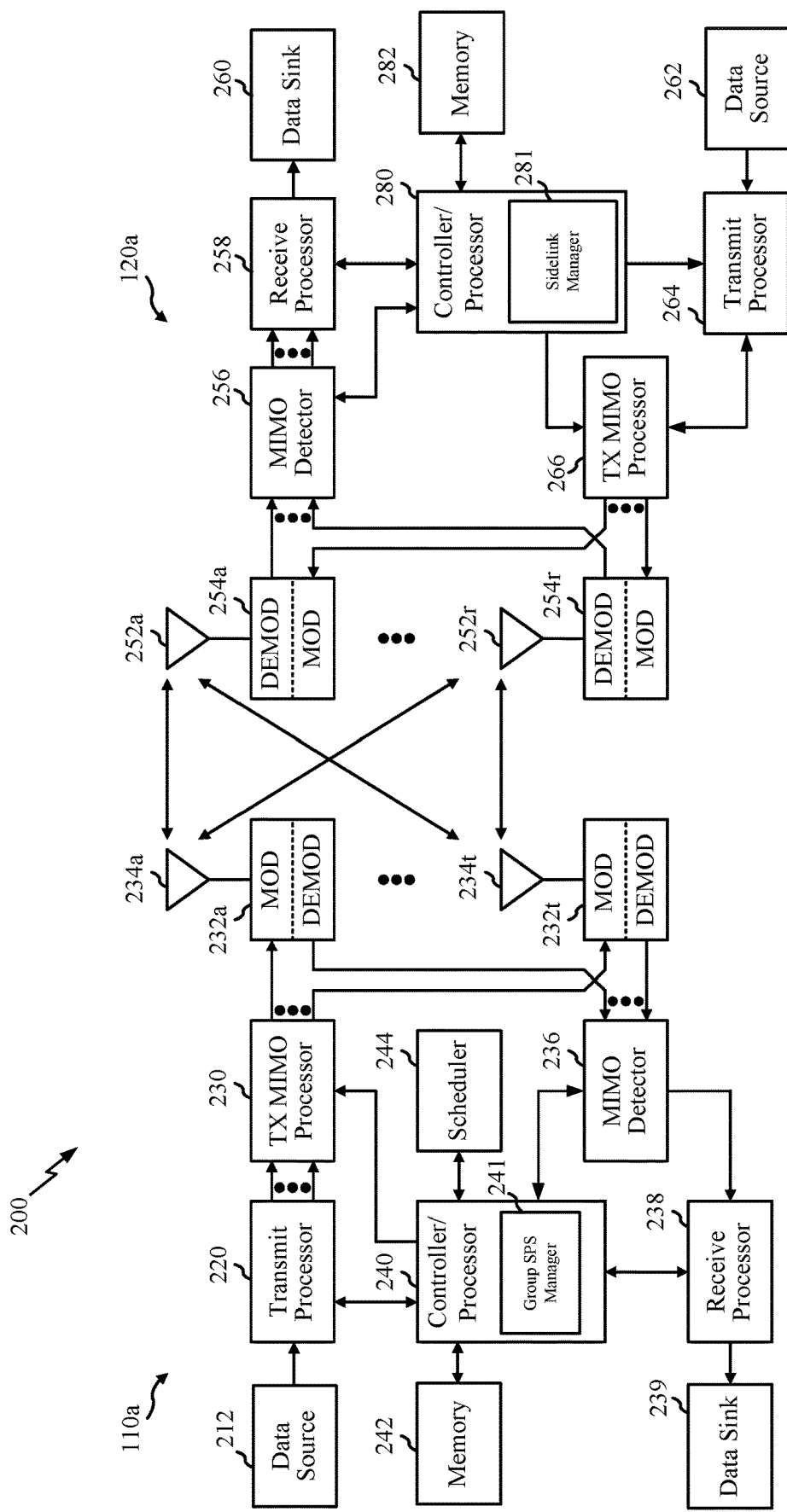
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. For example, the BS 110a may transmit a MAC-CE to a UE 120a to put the UE 120a into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel (PSSCH). A MAC-CE may also be used to communicate information that facilitates communication, such as information regarding buffer status and available power headroom.

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has a Group SPS manager 241 that may be configured for group SPS for path diversity, according to aspects described herein. As shown in FIG. 2, the controller/processor 280 of the UE 120a has a sidelink manager 241 that may be configured for group SPS for path diversity, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
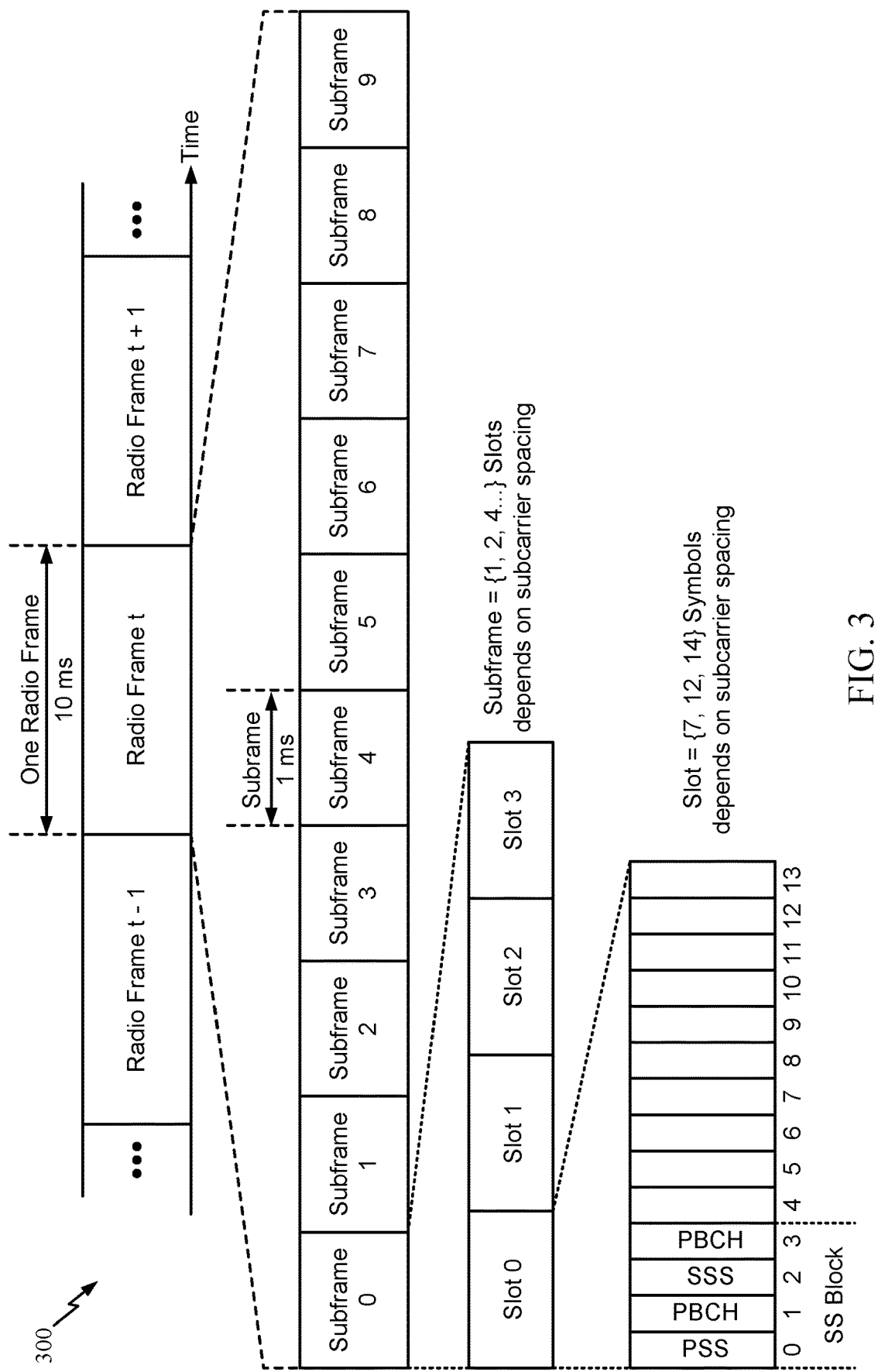
FIG. 3 is an example frame format for certain wireless communication systems (e.g., new radio (NR)), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7, 12, or 14 symbols) depending on the SCS. The symbol periods in each slot may be assigned indices. A sub-slot structure may refer to a transmit time interval having a duration less than a slot (e.g., 2, 3, or 4 symbols). Each symbol in a slot may be configured for a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal block (SSB) is transmitted. In certain aspects, SSBs may be transmitted in a burst where each SSB in the burst corresponds to a different beam direction for UE-side beam management (e.g., including beam selection and/or beam refinement). The SSB includes a PSS, a SSS, and a two symbol PBCH. The SSB can be transmitted in a fixed slot location, such as the symbols 0-3 as shown in FIG. 3. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SSBs may be organized into SS bursts to support beam sweeping. Further system information such as, remaining minimum system information (RMSI), system information blocks (SIBs), other system information (OSI) can be transmitted on a physical downlink shared channel (PDSCH) in certain subframes. The SSB can be transmitted up to sixty-four times, for example, with up to sixty-four different beam directions for mmWave. The multiple transmissions of the SSB are referred to as a SS burst set. SSBs in an SS burst set may be transmitted in the same frequency region, while SSBs in different SS bursts sets can be transmitted at different frequency regions.

In some examples, access to the air interface may be scheduled. A scheduling entity (e.g., a BS 110) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. BSs 110 are not the only entities that may function as a scheduling entity. In some examples, a UE 120 may function as a scheduling entity and may schedule resources for one or more subordinate entities (e.g., one or more other UEs 120), and the other UEs 120 may utilize the resources scheduled by the UE 120 for wireless communication. In some examples, a UE 120 may function as a scheduling entity in a peer-to-peer (P2P) network, and/or in a mesh network. In a mesh network example, UEs 120 may communicate directly with one another in addition to communicating with a scheduling entity.

In some examples, the communication between the UEs 120 and BSs 110 is referred to as the access link (or direct link). The access link may be provided via a Uu interface. Communication between UEs may be referred as the sidelink.

In some examples, two or more subordinate entities (e.g., UEs 120) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE 120a) to another subordinate entity (e.g., another UE 120) without relaying that communication through the scheduling entity (e.g., UE 120 or BS 110), even though the scheduling entity may be utilized for scheduling and/or control purposes. In some examples, the sidelink signals may be communicated using a licensed spectrum (unlike wireless local area networks, which typically use an unlicensed spectrum). One example of sidelink communication is PC5, for example, as used in V2V, LTE, and/or NR.

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state feedback (CSF) related to a sidelink channel quality.

In some cases, sidelinks may be used in industrial Internet-of-Things (IoT) systems. IIOT wireless devices may enable machines to tell operators how to optimize productivity or detect a failure before it occurs, thereby saving costs to companies. Use of sidelink in IIOT may reduce latency, provide multi-path diversity, extend coverage, improve battery-lifetime, provide location enhancement, and enable infrastructure-less communication.

Figure 4:
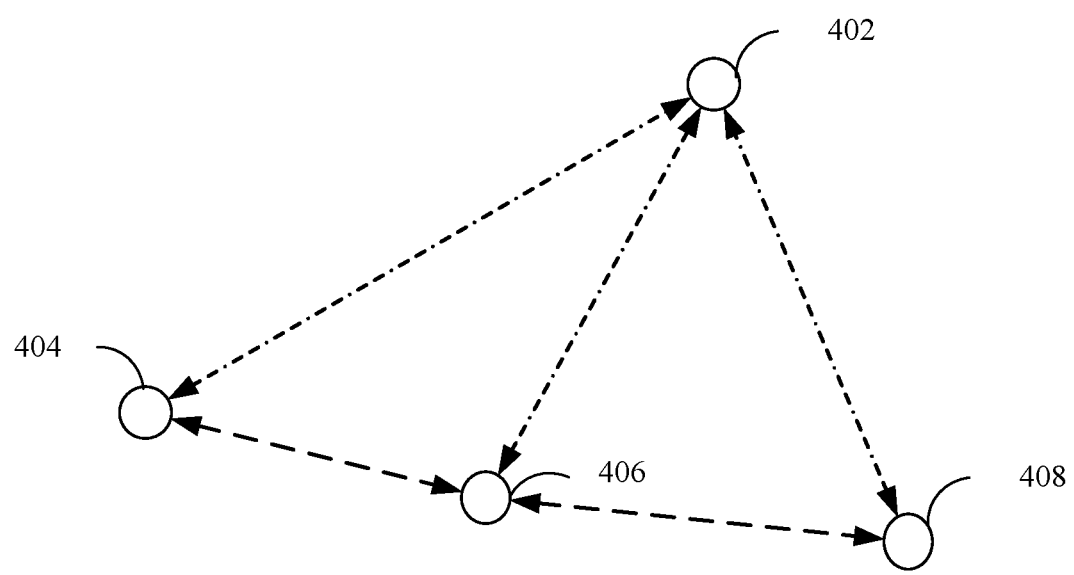
FIG. 4 is a diagram showing example access links and sidelink links, in accordance with certain aspects of the present disclosure.
Figure 5:
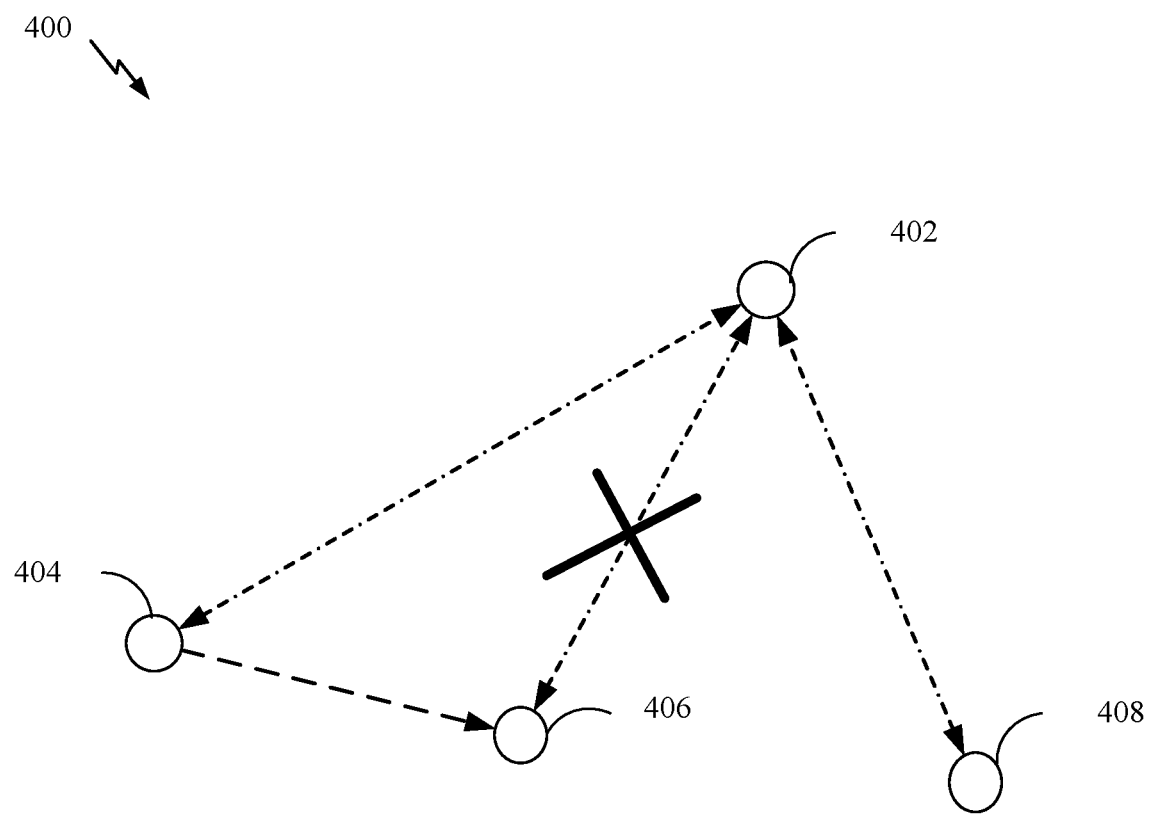
FIG. 5 is a diagram showing an example blocked access link, in accordance with certain aspects of the present disclosure.
Figure 6:
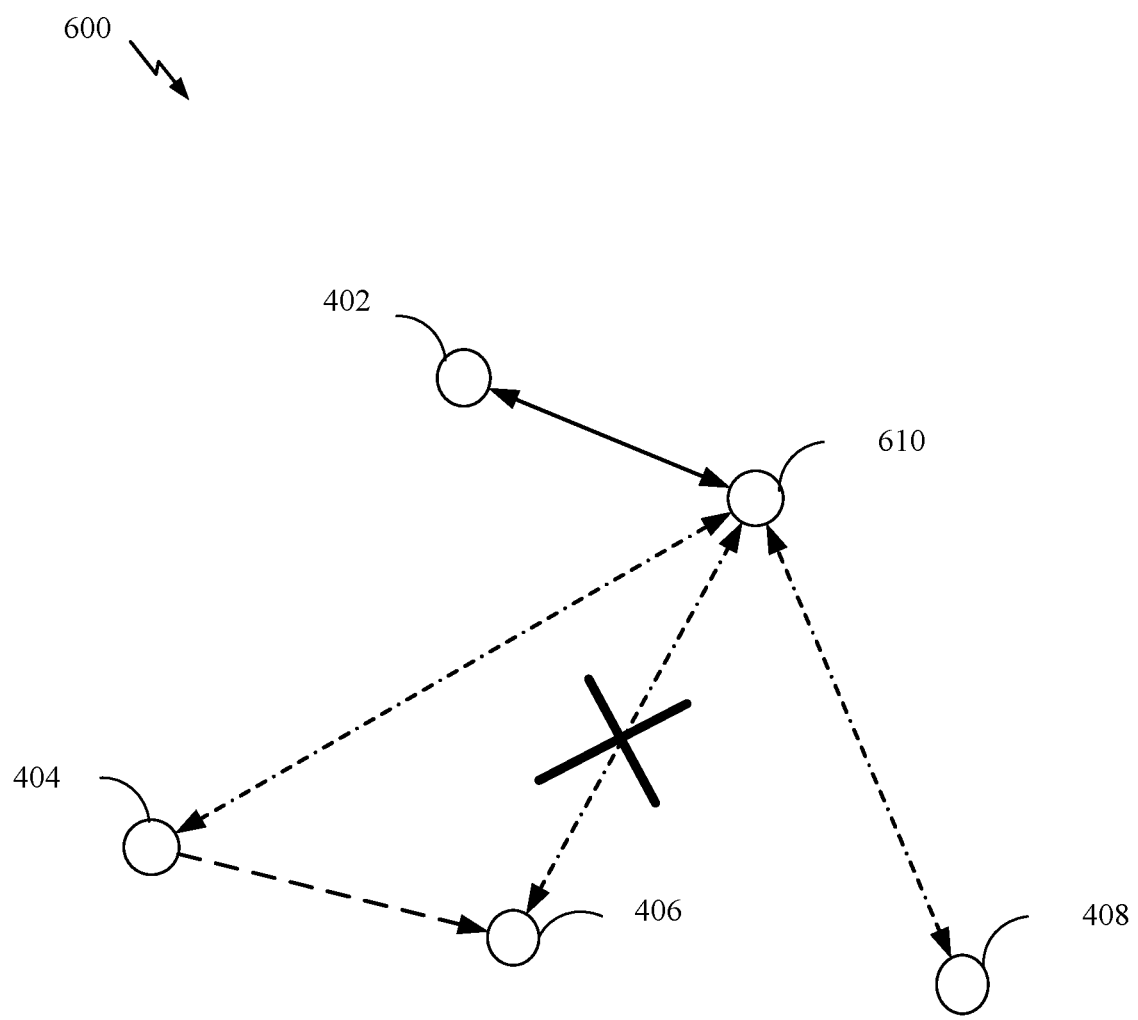
FIG. 6 is a diagram showing an example blocked sidelink, in accordance with certain aspects of the present disclosure.

FIGS. 4, 5, and 6 are diagrams showing example access links and sidelink links, in accordance with certain aspects of the present disclosure. As shown in FIG. 4, an IIOT system 400 may include a gNB 402 and sidelink devices 404, 406, 408 (which may be UEs). The gNB 402 communicates with the sidelink devices 404, 406, 408 via direct links and the sidelink devices 404, 406, 408 communicate with each other via sidelinks. In some cases, however, a direct link between the gNB 402 and a sidelink device 406 may be blocked, as shown in FIG. 5. In some cases, a programmable logical controller (PLC) may be used. For example, gNB 402 in the IIOT system 600 communicates with a PLC 610 via a direct link and the PLC 610 communicates with the sidelink devices 404, 406, 408 via sidelinks (and/or via access links), as shown in FIG. 6.

To increase path diversity, sidelink devices in the system (e.g., referred to herein as helper UEs) may retransmit the initial transmission from the gNB or PLC to other sidelink devices in the system (e.g., referred to herein as target UEs), such as sidelink UEs that have a blocked link with the gNB or PLC.

In some cases, the sidelink devices can perform sidelink channel signal quality measurements, such as reference signal receive power (RSRP) measurements, of pilot signals.

The sidelink devices can report the sidelink channel measurements to the gNB. Based on the reported measurements, the gNB schedules the sidelink devices. For example, the gNB can select the helper UEs and target UEs.

Example Group SPS for Path Diversity

Aspects of the present disclosure provide group semi-persistent scheduling (SPS) for path diversity.

As mentioned above, sidelink communication may be configured. In some aspects, sidelink communication may be configured in industrial Internet-of-Thing (IIoT) systems. In IIoT, the traffic may be periodic and traffic arrival times may be known. Thus, SPS scheduling may be used for data transmissions from a base station (BS) to user equipments (UEs), and/or from a programmable logical controller (PLC) to the UEs.

SPS can reduce control channel overhead. For example, services that use persistent radio resources at regular intervals may involve a high amount of control channel overhead. To avoid using a high amount of downlink assignment and uplink grants, SPS can significantly reduce the control channel overhead by using a minimum amount downlink assignments and uplink grants. For example, SPS may allocates radio resources for a long period of time. Once SPS is configured, a UE may receive/send data at a configured periodicity.

Figure 7:
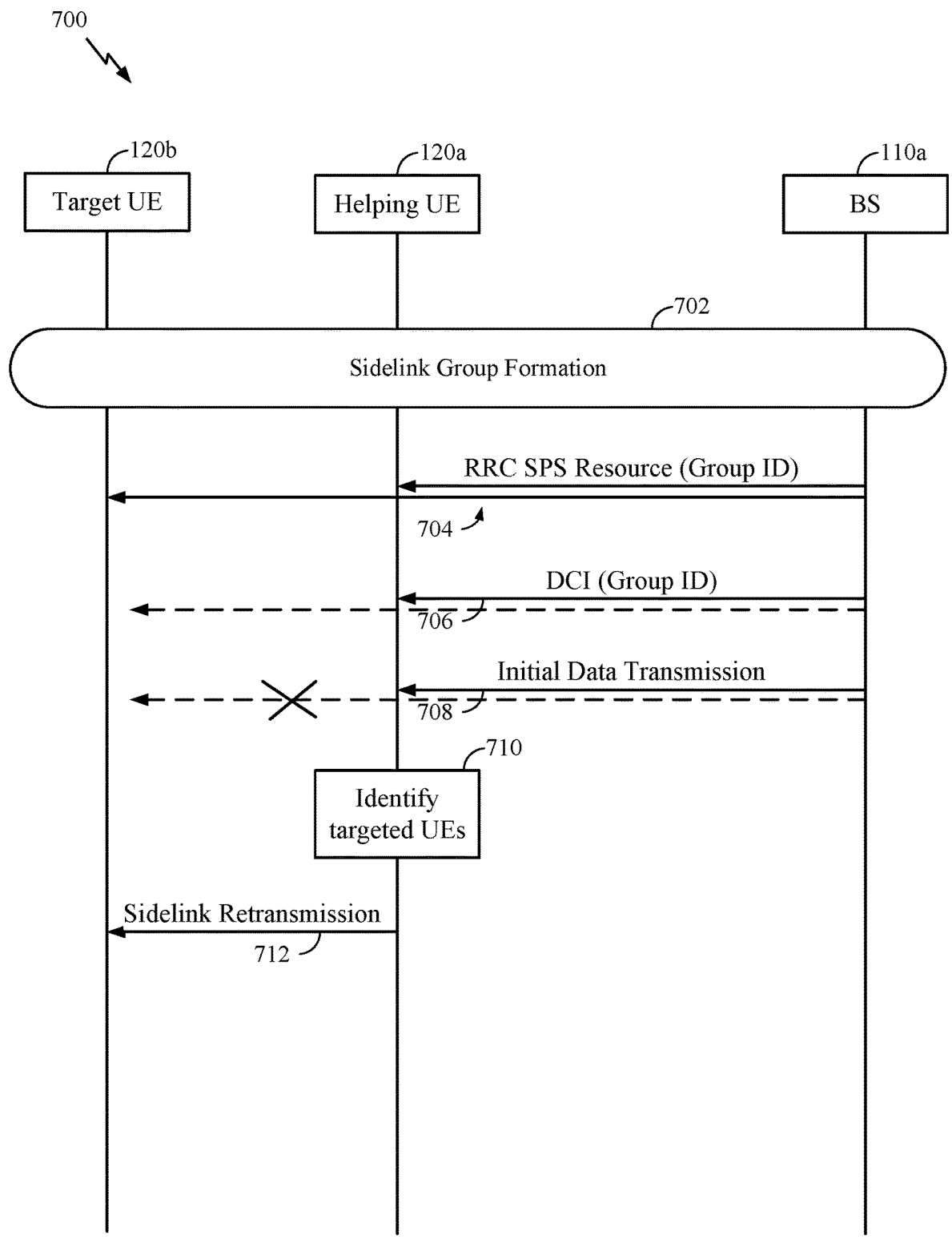
FIG. 7 is a call flow diagram illustrating example signaling for group semi-persistent scheduling (SPS) for path diversity, in accordance with aspects of the present disclosure.

FIG. 7 is a call flow diagram illustrating example operations 600 for group SPS for path diversity. Although FIG. 7 shows a BS 110a, the operations may also be performed by a PLC, for example, in communication with the BS 110a. As shown in FIG. 7, at 702 one or more sidelink groups may be formed, each group including one or more "helper" UEs 120a and one or more "target" UEs 120b. Each helper UE 120a is configured to store (and/or retransmit) data from the BS 110a to one or more target UEs 120b, as further described herein. In some examples, the sidelink group may be configured by the BS 110a. For example, the sidelink group formation at 702 may include the UEs 120a, 120b exchanging a reference signal (e.g., sidelink channel state information reference signals (CSI-RSs)), measuring the channel quality, and reporting the measurements to the BS 110a. Based on the reported measurements, the BS 110a may form the sidelink groups.

At 704, the BS 110a may configure one or more SPS resources for the one or more groups of UEs. As shown in FIG. 7, the BS 110a sends radio resource control (RRC) signaling configuring the UE 120a and UE 120b with a common SPS resource. In some examples, the common SPS resource can be used by UEs in the sidelink group for broadcast and/or multicast transmissions. According to certain aspects, the BS 110a further configures a group ID (or group IDs) associated with the common SPS resource. The group ID can be used to activate the common SPS resource for the associated group or groups of UEs.

According to certain aspects, the BS 110a can activate (e.g., or release) a configured SPS resource (or resources) using a common downlink control information (DCI). As shown in FIG. 7, at 706, the BS 110a sends DCI to at least the helper UE 120a. The DCI may also be transmitted to the target UE 120b. The UE 120b may or may not receive the DCI depending on if the link is blocked. In some examples, the group ID is a Group-SPS-RNTI (radio network temporary identifier).

At 708, the BS 110a sends an initial transmission to the sidelink group including the UEs 120a, 120b. In some examples, the helper UE 120a may store the initial transmission in a buffer for later retransmission to a target UE(s). The buffer may be a separate (e.g., dedicated) HARQ buffer for sidelink retransmissions.

At 710, the helper UE 120a may determine the target UE of the initial data transmission.

In some examples, the BS 110a further configures the targeted UEs configured scheduling (CS) RNTI or semi-persistent scheduling cell RNTI (SPS-C-RNTI) via RRC. For example, the targeted UE IDs may be configured in addition to the common SPS resource(s) and group ID(s) at 704. The CS-RNTIs or SPS-C-RNTIs may be used for SPS activation/release. In this case, the helper UE 120a can identify the target UE 120b based on the CS-RNTI or SPS-C-RNTI.

In some examples, at 704, the BS 110a configures (e.g., via RRC) the helper UE IDs and the target UE IDs in addition to the group ID associated with the common SPS resource. Thus, when the SPS resource is activated at 706, the helper UE 120a knows (e.g., can determine or identify) the associated helper UEs and targeted UEs (e.g., target UE 120b).

In some examples, the BS 110a configures (e.g., via RRC) the UEs associated with the group ID at 704, but the RRC configuration does not indicate which UEs are helper and target UEs. In this case, the targeted UE IDs may be indicated in the DCI, at 706, in addition to the group ID for SPS activation (or release) and/or indicated in the channel (e.g., the physical downlink shared channel (PDSCH)) with the SPS data message at 708.

At 712, the helper UE 120a may send a sidelink retransmission, of the initial data transmission received at 708 (e.g., and stored in a buffer at the UE 120a), to the identified target UE 120b. In some examples, the retransmission is triggered (e.g., requested, indicated, scheduled) by the BS 110a. For example, the BS 110a may identify that the target UE 120b failed to successfully decode the initial transmission. For example, the BS 110a may identify, after a certain time period, that the BS 110a has not received an acknowledgement (ACK) or a negative acknowledgement (NACK) from the target UE 120b. Based on detecting the failure to receive HARQ feedback from the target UE 120b, the BS 110a may assume that the target UE 120b was not able to successfully decode the initial transmission. In this case, the BS 110a may signal (e.g., via a physical downlink control channel (PDCCH) transmission) to the helper UE 120a to retransmit the data to the target UE 120b.

According to certain aspects, the configured common SPS resource(s) may be updated (or reconfigured). In some examples, when the resource allocation for the SPS is changed, the BS 110a may indicate the change in the DCI that is used for SPS activation (or release) at 706. In some examples, the BS 110a also indicates, for example in the DCI at 706, whether the UEs 120a, 120b are requested to acknowledge the SPS resource change. The BS 110a can configure the resource used for the acknowledgement, for example, during the RRC configuring the initial SPS resource allocation at 704. Thus, the UEs 120a, 120b may monitor DCI for the activation (or release) as well as for SPS resource change.

Figure 8:
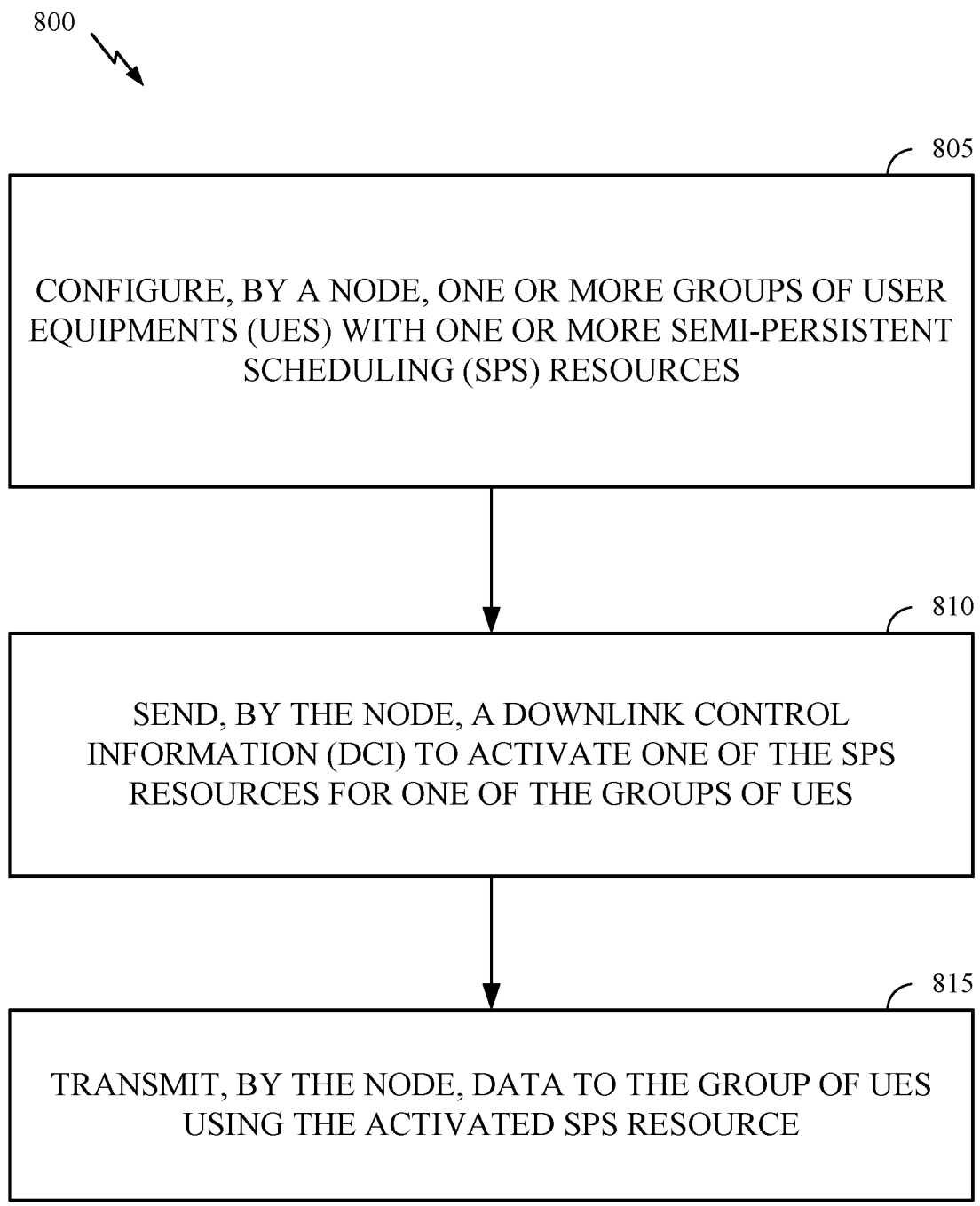
FIG. 8 is a flow diagram illustrating example operations for wireless communication by a BS, in accordance with certain aspects of the present disclosure.

FIG. 8 is a flow diagram illustrating example operations 800 for wireless communication, in accordance with certain aspects of the present disclosure. The operations 800 may be performed, for example, by a node, such as a BS (e.g., the BS 110a in the wireless communication network 100) or a PLC (not shown). The operations 800 may be complimentary operations by the node to the operations 900 and/or 1000 performed by the UE. Operations 800 may be implemented as software components that are executed and run on one or more processors (e.g., controller/processor 240 of FIG. 2). Further, the transmission and reception of signals by the node in operations 800 may be enabled, for example, by one or more antennas (e.g., antennas 234 of FIG. 2). In certain aspects, the transmission and/or reception of signals by the node may be implemented via a bus interface of one or more processors (e.g., controller/processor 240) obtaining and/or outputting signals.

The operations 800 may begin, at 805, by configuring (e.g., via RRC signaling) one or more groups of UEs with one or more SPS resources (e.g., common SPS resources). In some examples, the one or more SPS resources are configured with one or more associated group IDs. The node may configure (e.g., via RRC signaling) Group-SPS-RNTI for activation (or release) of SPS resources. In some examples, the node may send RRC signaling indicating a first subset of one or more UEs in the group (e.g., helper UEs) and a second subset of one or more UEs in the group (e.g., targeted UEs). The first subset of one or more UEs may be configured to retransmit the data to the second subset of one or more UEs. In some examples, the BS sends RRC signaling indicating the UEs in the group. The identifiers may be CS-RNTIs or SPS-C-RNTIs. In some examples, the node configures (e.g., via RRC) the group of UEs with a resource for acknowledging an SPS resource update.

At 810, the node sends a DCI to activate one of the SPS resources for one of the groups of UEs. In some examples, the node sends a common DCI including a Group-SPS-RNTI to activate the SPS resource for the group of UEs. In some examples, the DCI includes one or more identifiers of a subset of one or more UEs in the group of UEs that are intended targets of the data. In some examples, the node sends a DCI including an indication of an updated SPS resource. The DCI may include a request for the group of UEs to acknowledge the updated SPS resource.

At 815, the node transmits data (e.g., an initial data transmission) to the group of UEs using the activated SPS resource. In some examples, the node indicates, in a PDSCH with the data transmission, one or more identifiers of a subset of UEs in the group of UEs that are intended targets of the data transmission.

In some examples, the node sends a further DCI to release the SPS resource.

Figure 9:
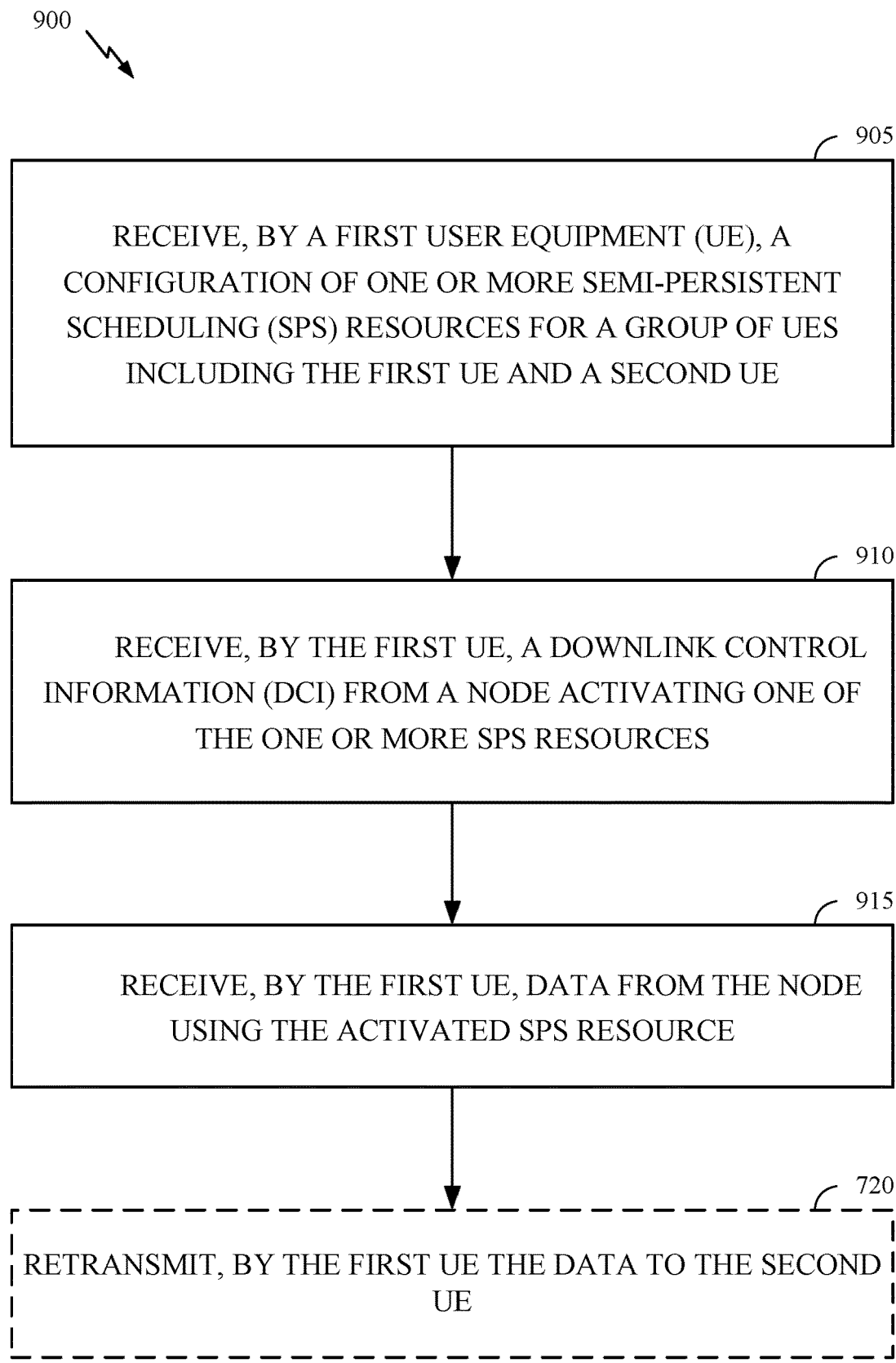
FIG. 9 is a flow diagram illustrating example operations for wireless communication by a helping UE, in accordance with certain aspects of the present disclosure.

FIG. 9 is a flow diagram illustrating example operations 900 for wireless communication, in accordance with certain aspects of the present disclosure. The operations 900 may be performed, for example, by a first UE (e.g., such as a UE 120*a* in the wireless communication network 100), which may be a helper UE. The operations 900 may be complimentary operations by the UE to the operations 800 performed by the node and/or the operations 1000 performed by the target UE. Operations 900 may be implemented as software components that are executed and run on one or more processors (e.g., controller/processor 280 of FIG. 2). Further, the transmission and reception of signals by the first UE in operations 900 may be enabled, for example, by one or more antennas (e.g., antennas 252 of FIG. 2). In certain aspects, the transmission and/or reception of signals by the first UE may be implemented via a bus interface of one or more processors (e.g., controller/processor 280) obtaining and/or outputting signals.

The operations 900 may begin, at 905, by receiving a configuration of one or more SPS resources for a group of UEs including the first UE and a second UE. In some examples, the one or more SPS resources are configured via RRC signaling. In some examples, the one or more SPS resources are configured with one or more associated group IDs. In some examples, the RRC signaling indicates a Group-SPS-RNTI. In some examples, the RRC signaling indicates a first subset of one or more UEs in the group and a second subset of one or more UEs in the group. The first subset of one or more UEs may be configured to retransmit the data to the second subset of one or more UEs. The first UE is in the first subset and the second UE is in the subset. In some examples, the RRC signaling indicates the UEs in the group. In some examples, the RRC signaling configures a resource for providing an acknowledgment of an updated SRS resource.

At 910, the first UE receives a DCI from a node activating one of the one or more SPS resources. In some examples, the DCI is a common DCI including a Group-SPS-RNTI to activate the SPS resource for the group of UEs. In some examples, the DCI further includes one or more identifiers of one or more UEs in the group of UEs that are intended targets of the data including an identifier of the second UE. In some examples, the one or more identifiers are CS-RNTIs or SPS-C-RNTIs. In some examples, the DCI includes one or more identifiers of the one or more UEs of the subset including an identifier of the second UE.

At 915, the first UE receives data from the node using the activated SPS resource. In some examples, the first UE receives an indication, in a PDSCH with the data, of one or more identifiers of one or more UEs in the group of UEs that are intended targets of the data transmission including an identifier of the second UE. The first UE may store the received data.

At 920, the first UE may retransmit the data to the second UE.

In some examples, the first UE receives a DCI including an indication of an updated SPS resource. The DCI may further includes a request for the UE to acknowledge the updated SPS resource.

In some examples, the first UE further receives a DCI to release the SPS resource.

Figure 10:
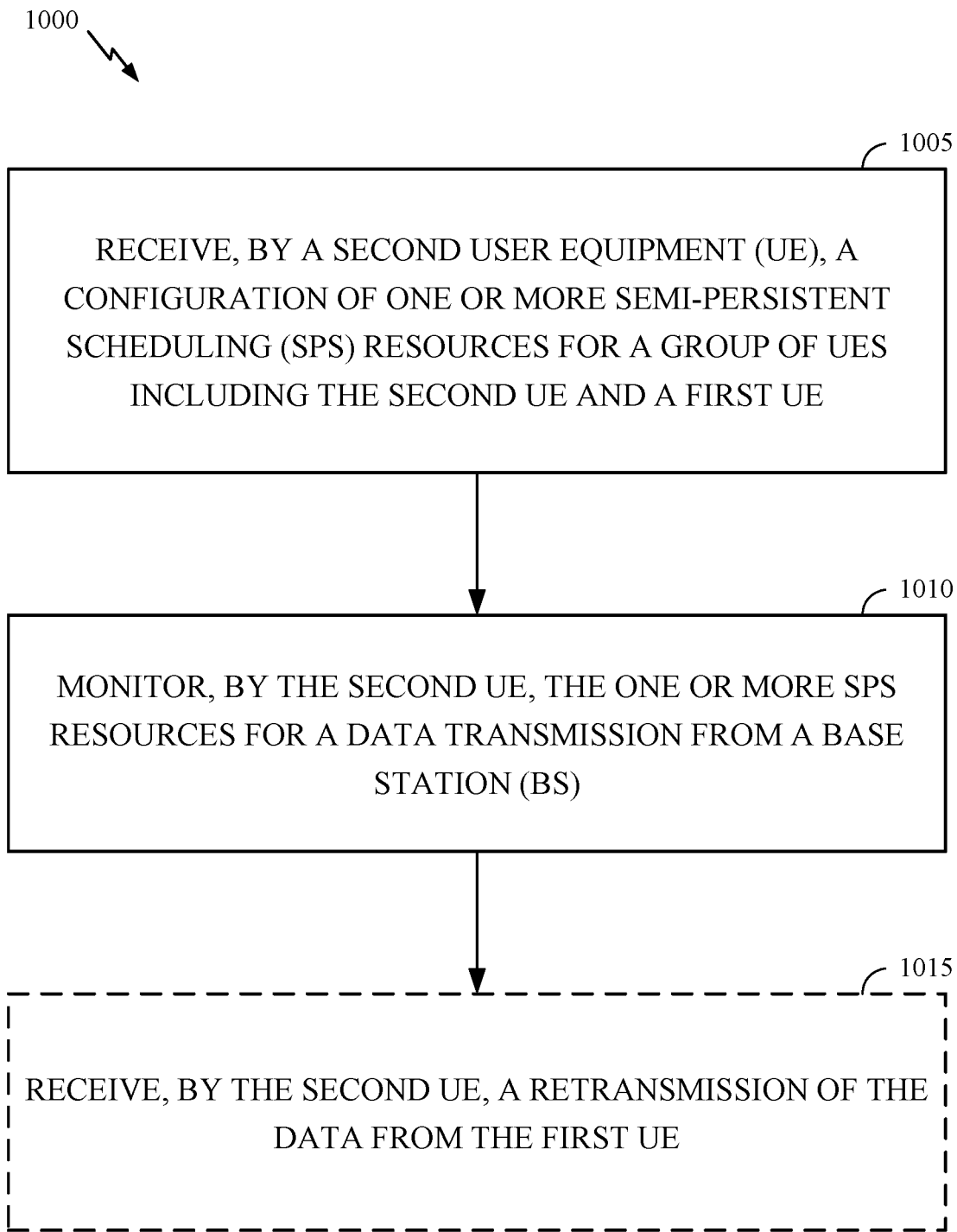
FIG. 10 is a flow diagram illustrating example operations for wireless communication by a target UE, in accordance with certain aspects of the present disclosure.

FIG. 10 is a flow diagram illustrating example operations 1000 for wireless communication, in accordance with certain aspects of the present disclosure. The operations 1000 may be performed, for example, by a second UE (e.g., such as a UE 120*b* in the wireless communication network 100), which may be a target UE. The operations 1000 may be complimentary operations by the second UE to the operations 800 performed by the node and/or the operations 900 performed by the helper UE. Operations 1000 may be implemented as software components that are executed and run on one or more processors (e.g., controller/processor 280 of FIG. 2). Further, the transmission and reception of signals by the second UE in operations 1000 may be enabled, for example, by one or more antennas (e.g., antennas 252 of FIG. 2). In certain aspects, the transmission and/or reception of signals by the second UE may be implemented via a bus interface of one or more processors (e.g., controller/processor 280) obtaining and/or outputting signals.

The operations 1000 may begin, at 1005, by receiving a configuration of one or more SPS resources for a group of UEs including the second UE and a first UE. The second UE may receive the RRC configuration described above for the first UE. The second UE may receive DCI as described above for the first UE.

At 1010, the second UE monitors the one or more SPS resources for a data transmission from a BS.

At 1015, the second UE may receive a data retransmission from the first UE. The second UE may receive updated SPS resources, configured acknowledgment resources, and/or DCI for SPS release as described above for the first UE.

Figure 11:
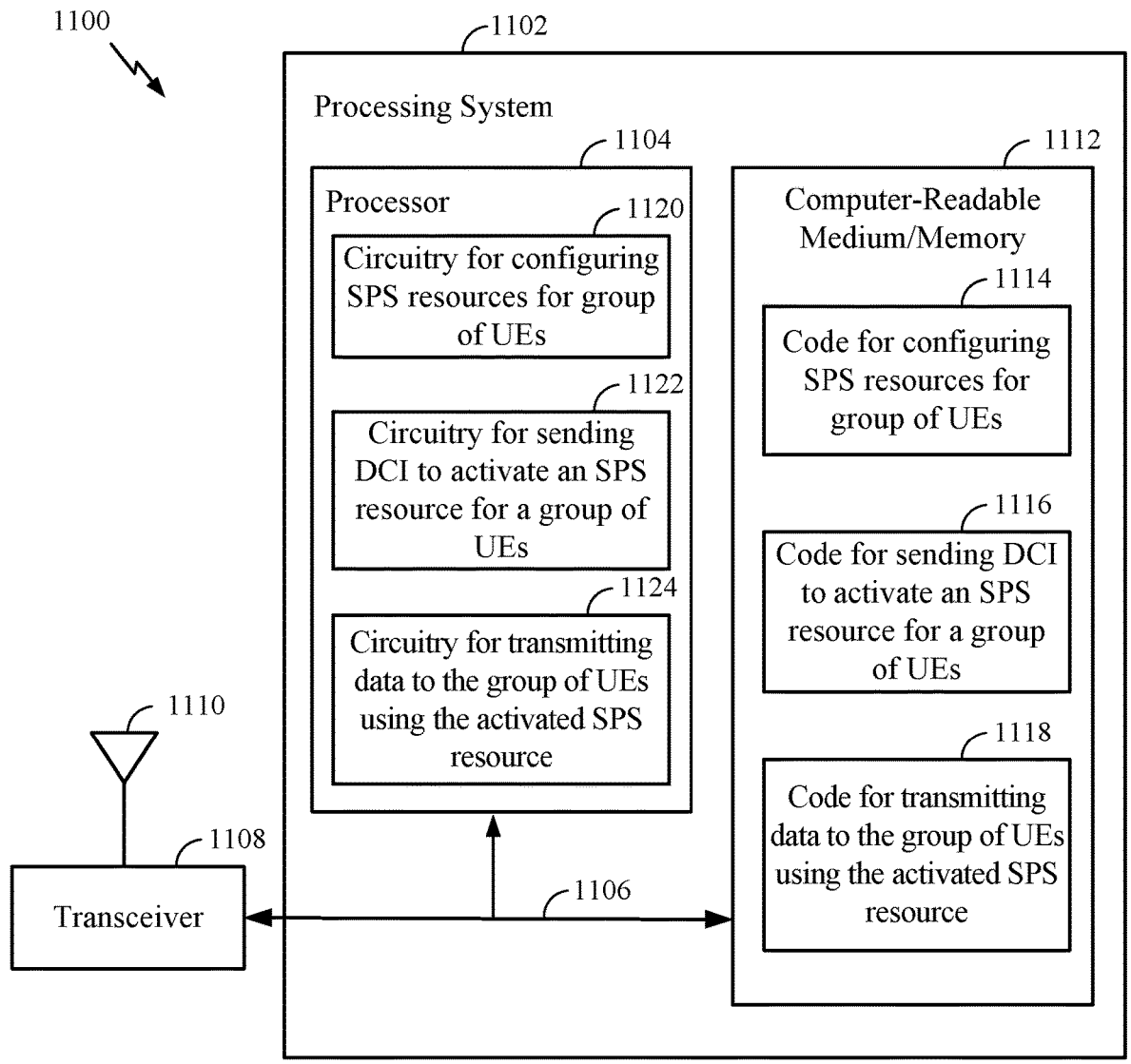
FIG. 11 illustrates a communications device that may include various components configured to perform operations for the techniques disclosed herein in accordance with aspects of the present disclosure.

FIG. 11 illustrates a communications device 1100 that may include various components (e.g., corresponding to means-plus-function components) configured to perform operations for the techniques disclosed herein, such as the operations illustrated in FIG. 8. The communications device 1100 includes a processing system 1102 coupled to a transceiver 1108 (e.g., a transmitter and/or a receiver). The transceiver 1108 is configured to transmit and receive signals for the communications device 1100 via an antenna 1110, such as the various signals as described herein. The processing system 1102 may be configured to perform processing functions for the communications device 1100, including processing signals received and/or to be transmitted by the communications device 1100.

The processing system 1102 includes a processor 1104 coupled to a computer-readable medium/memory 1112 via a bus 1106. In certain aspects, the computer-readable medium/memory 1112 is configured to store instructions (e.g., computer-executable code) that when executed by the processor 1104, cause the processor 1104 to perform the operations illustrated in FIG. 8, or other operations for performing the various techniques discussed herein for group SPS for path diversity. In certain aspects, computer-readable medium/memory 1112 stores code 1114 for configuring one or more SPS resources for one or more groups of UEs; code 1116 for sending DCI to activate an SPS resource for a group of UEs; and code 1118 for transmitting data to the group of UEs using the activated SPS resource, in accordance with aspects of the present disclosure. In certain aspects, the processor 1104 has circuitry configured to implement the code stored in the computer-readable medium/memory 1112. The processor 1104 includes circuitry 1120 for configuring one or more SPS resources for one or more groups of UEs; circuitry 1122 for sending DCI to activate an SPS resource for a group of UEs; and circuitry 1124 for transmitting data to the group of UEs using the activated SPS resource, in accordance with aspects of the present disclosure.

For example, means for transmitting (or means for outputting for transmission), means for configuring, means for sending, and/or means for communicating may include a transmitter and/or an antenna(s) 234 or the BS 110a illustrated in FIG. 2 and/or transceiver 1108, antenna 1110, circuitry 1220, circuitry 1122, and/or circuitry 1224 of the communication device 1100 in FIG. 11. Means for receiving (or means for obtaining) may include a receiver and/or an antenna(s) 234 of the BS 110a illustrated in FIG. 2 and/or transceiver 1108 and/or antenna 11110 of the communication device 1100 in FIG. 11. Means for means for determining may include a processing system, which may include one or more processors, such as the transmit processor 220, the TX MIMO processor 230, the receive processor 238, and/or the controller/processor 240 of the BS 110a illustrated in FIG. 2 and/or the processing system 1102 of the communication device 1100 in FIG. 11.

Figure 12:
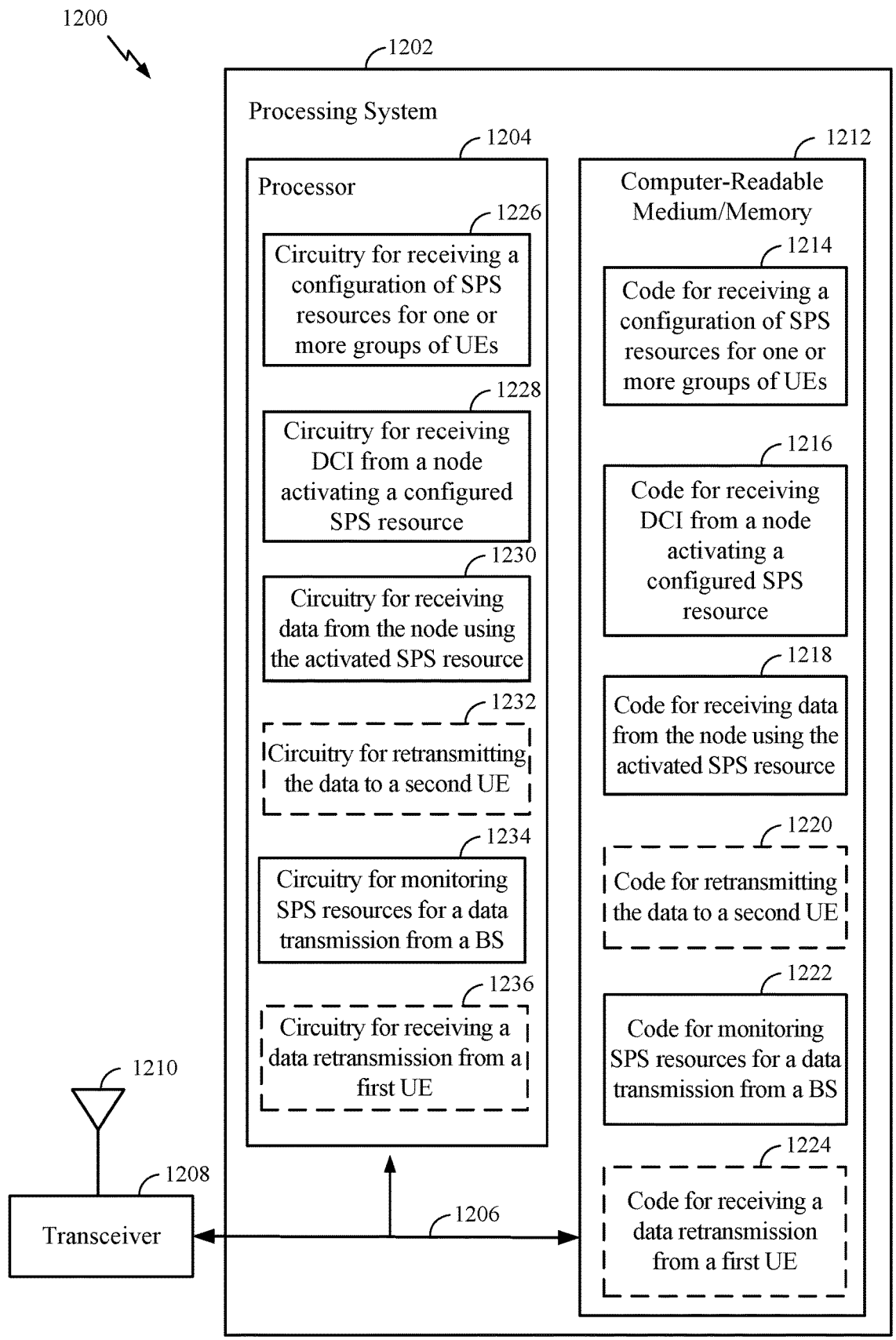
FIG. 12 illustrates a communications device that may include various components configured to perform operations for the techniques disclosed herein in accordance with aspects of the present disclosure.

FIG. 12 illustrates a communications device 1200 that may include various components (e.g., corresponding to means-plus-function components) configured to perform operations for the techniques disclosed herein, such as the operations illustrated in FIG. 9 and/or FIG. 10. The communications device 1200 includes a processing system 1202 coupled to a transceiver 1208 (e.g., a transmitter and/or a receiver). The transceiver 1208 is configured to transmit and receive signals for the communications device 1200 via an antenna 1210, such as the various signals as described herein. The processing system 1202 may be configured to perform processing functions for the communications device 1200, including processing signals received and/or to be transmitted by the communications device 1200.

The processing system 1202 includes a processor 1204 coupled to a computer-readable medium/memory 1212 via a bus 1206. In certain aspects, the computer-readable medium/memory 1212 is configured to store instructions (e.g., computer-executable code) that when executed by the processor 1204, cause the processor 1204 to perform the operations illustrated in FIG. 10 and/or FIG. 22, or other operations for performing the various techniques discussed herein for group SPS for path diversity. In certain aspects, computer-readable medium/memory 1212 stores code 1214 for receiving a configuration of one or more SPS resources for one or more groups of UEs; code 1216 for receiving DCI from a node activating a configured SPS resource; code 1218 for receiving data from the node using the activated SPS resource; code 1220 for retransmitting the data to a second UE; code 1222 for monitoring SPS resources for a data transmission from a BS; and/or code 1224 for receiving a data retransmission from a first UE, in accordance with aspects of the disclosure. In certain aspects, the processor 1204 has circuitry configured to implement the code stored in the computer-readable medium/memory 1212. The processor 1204 includes circuitry 1225 for receiving a configuration of one or more SPS resources for one or more groups of UEs; circuitry 1128 for receiving DCI from a node activating a configured SPS resource; circuitry 1230 for receiving data from the node using the activated SPS resource; circuitry 1232 for retransmitting the data to a second UE; circuitry 1234 for monitoring SPS resources for a data transmission from a BS; and/or circuitry 1236 for receiving a data retransmission from a first UE, in accordance with aspects of the disclosure.

For example, means for transmitting (or means for outputting for transmission), means for retransmitting, means for communicating, and/or means for sending may include the transmitter unit 254 and/or antenna(s) 252 of the UE 120a illustrated in FIG. 2 and/or circuitry 1232, transceiver 1208, and/or antenna 1210 of the communication device 1200 in FIG. 12. Means for receiving (or means for obtaining) and/or means for monitoring may include a receiver and/or antenna(s) 252 of the UE 120a illustrated in FIG. 2 and/or circuitry 1226, 1228, 1230, 1234, 1236, transceiver 1208, and/or antenna 1210 of the communication device 1200 in FIG. 12. Means for determining, means for taking action, means for determining may include a processing system, which may include one or more processors, such as the receive processor 258, the transmit processor 264, the TX MIMO processor 266, and/or the controller/processor 280 of the UE 120a illustrated in FIG. 2 and/or the processing system 1202 of the communication device 1200 in FIG. 12.

Example Aspects

Aspect 1: A method for wireless communications by a node, comprising: configuring one or more groups of user equipments (UEs) with one or more semi-persistent scheduling (SPS) resources; sending a downlink control information (DCI) to activate one of the SPS resources for one of the groups of UEs; and transmitting data to the group of UEs using the activated SPS resource.

Aspect 2. The method of aspect 1, wherein the one or more SPS resources are configured via radio resource control (RRC) signaling.

Aspect 3: The method of any of aspects 1 or 2, wherein the one or more SPS resources are configured with one or more associated group identifiers (IDs).

Aspect 4: The method of any of aspects 1-3, wherein the DCI comprises a common DCI including a group SPS radio network temporary identifier (Group-SPS-RNTI) to activate the SPS resource for the group of UEs.

Aspect 5: The method of aspect 4, further comprising configuring the Group-SPS-RNTI via radio resource control (RRC) signaling.

Aspect 6: The method of any of aspects 4 or 5, further comprising sending radio resource control (RRC) signaling indicating a first subset of one or more UEs in the group of UEs and a second subset of one or more UEs in the group of UEs, wherein the first subset of one or more UEs is configured to resend the data to the second subset of one or more UEs.

Aspect 7: The method of any of aspects 4-6, further comprising sending radio resource control (RRC) signaling indicating the UEs in the group.

Aspect 8: The method of aspect 7, wherein the DCI further includes one or more identifiers of one or more UEs in the group of UEs that are intended targets of the data.

Aspect 9: The method of any of aspects 7 or 8, further comprising indicating, in a physical downlink shared channel (PDSCH) with the data, one or more identifiers of one or more UEs in the group of UEs that are intended targets of the data.

Aspect 10: The method of any of aspects 4-9, further comprising configuring a first subset of one or more UEs in the group of UEs with one or more identifiers of a second subset of one or more UEs in the group of UEs, wherein the first subset of one or more UEs are configured to resend the data to the second subset of one or more UEs.

Aspect 11: The method of aspect 10, wherein the one or more identifiers of the second subset of the group of UEs comprise configured scheduling radio network temporary identifiers (CS-RNTIs) or SPS cell RNTIs (SPS-C-RNTIs).

Aspect 12: The method of any of aspects 10 or 11, wherein the DCI further includes one or more identifiers of the one or more UEs of the subset.

Aspect 13: The method of any of aspects 1-12, further comprising sending a DCI including an indication of an updated SPS resource.

Aspect 14: The method of aspect 13, wherein the DCI further includes a request for the group of UEs to acknowledge the updated SPS resource.

Aspect 15: The method of aspect 14, further comprising configuring the group of UEs with a resource for providing an acknowledgment via radio resource control (RRC) signaling.

Aspect 16: The method of any of aspects 1-15, further comprising sending a DCI to release the SPS resource.

Aspect 17: A method for wireless communications by a first user equipment (UE), comprising: receiving a configuration of one or more semi-persistent scheduling (SPS) resources for a group of UEs including the first UE and a second UE; receiving a downlink control information (DCI) from a node activating one of the one or more SPS resources; and receiving data from the node using the activated SPS resource.

Aspect 18: The method of aspect 17, further comprising retransmitting the data to the second UE.

Aspect 19: The method of any of aspects 17 or 18, wherein the one or more SPS resources are configured via radio resource control (RRC) signaling.

Aspect 20: The method of any of aspect 17-19, wherein the one or more SPS resources are configured with one or more associated group identifiers (IDs).

Aspect 21 The method of: any of aspects 17-20, wherein the DCI comprises a common DCI including a group SPS radio network temporary identifier (Group-SPS-RNTI) to activate the SPS resource for the group of UEs.

Aspect 22: The method of aspect 21, further comprising receiving a configuration of the Group-SPS-RNTI via radio resource control (RRC) signaling.

Aspect 23: The method of any of aspects 21 or 22, further comprising receiving radio resource control (RRC) signaling indicating a first subset of one or more UEs in the group and a second subset of one or more UEs in the group, wherein the first subset of one or more UEs is configured to retransmit the data to the second subset of one or more UEs, and wherein the first UE is in the first subset and the second UE is in the sub set.

Aspect 24: The method of any of aspects 21-23, further comprising receiving radio resource control (RRC) signaling indicating the UEs in the group.

Aspect 25: The method of any of aspects 23 or 24, wherein the DCI further includes one or more identifiers of one or more UEs in the group of UEs that are intended targets of the data including an identifier of the second UE.

Aspect 26: The method of any of aspects 23-25, further comprising receiving an indication, in a physical downlink shared channel (PDSCH) with the data, of one or more identifiers of one or more UEs in the group of UEs that are intended targets of the data including an identifier of the second UE.

Aspect 27: The method of any of aspects 21-26, further comprising receiving a configuration of one or more identifiers of a subset of one or more UEs in the group of UEs, wherein the UE is configured to retransmit the data to the subset of one or more UEs, wherein the one or more identifiers include an identifier of the second UE.

Aspect 28: The method of aspect 27, wherein the one or more identifiers of the subset of the group of UEs comprise configured scheduling radio network temporary identifiers (CS-RNTIs) or SPS cell RNTIs (SPS-C-RNTIs).

Aspect 29: The method of any of aspects 27 or 28, wherein the DCI further includes one or more identifiers of the one or more UEs of the subset including an identifier of the second UE.

Aspect 30: The method of any of aspects 17-29, further comprising receiving a DCI including an indication of an updated SPS resource.

Aspect 31: The method of aspect 30, wherein the DCI further includes a request for the UE to acknowledge the updated SPS resource.

Aspect 32: The method of aspect 31, further comprising receiving radio resource control (RRC) signaling configuring a resource for providing an acknowledgment.

Aspect 33: The method of any of aspects 17-32, further comprising receiving a DCI to release the SPS resource.

Aspect 34: A method for wireless communications by a second user equipment (UE), comprising: receiving a configuration of one or more semi-persistent scheduling (SPS) resources for a group of UEs including the second UE and a first UE; and monitoring the one or more SPS resources for a data transmission from a base station (B S).

Aspect 35: The method of aspect 34, further comprising receiving a retransmission of the data from the first UE.

Aspect 36: The method of any of aspects 34 or 35, wherein the one or more SPS resources are configured via radio resource control (RRC) signaling.

Aspect 37: The method of any of aspects 34-36, wherein the one or more SPS resources are configured with one or more associated group identifiers (IDs).

Aspect 38: The method of any of aspects 34-37, further comprising receiving downlink control information (DCI) comprising a common DCI scheduling data from a base station (BS) and including a group SPS radio network temporary identifier (Group-SPS-RNTI) to activate the SPS resource for the group of UEs.

Aspect 39: The method of aspect 38, further comprising receiving a configuration of the Group-SPS-RNTI via radio resource control (RRC) signaling.

Aspect 40: The method of any of aspects 38 or 39, further comprising receiving radio resource control (RRC) signaling indicating a first subset of one or more UEs in the group and a second subset of one or more UEs in the group, wherein the first subset of one or more UEs is configured to retransmit the data to the second subset of one or more UEs, and wherein the first UE is in the first subset and the second UE is in the sub set.

Aspect 41: The method of any of aspects 38-40, further comprising receiving radio resource control (RRC) signaling indicating the UEs in the group.

Aspect 42: The method of aspect 41, wherein the DCI further includes one or more identifiers of one or more UEs in the group of UEs that are intended targets of the data including an identifier of the second UE.

Aspect 43: The method of any of aspect 41 or 42, further comprising receiving an indication, in a physical downlink shared channel (PDSCH) with the data, of one or more identifiers of one or more UEs in the group of UEs that are intended targets of the data including an identifier of the second UE.

Aspect 44: The method of any of aspects 38-43, further comprising receiving a configuration of one or more identifiers of one or more UEs in a first subset of the group of UEs and one or more identifiers of one or more UEs in a second subset of the group of UEs, wherein the first subset of one or more UEs are configured to resend the data to the second subset of one or more UEs.

Aspect 45: The method of aspect 44, wherein the one or more identifiers of the subset of the group of UEs comprise configured scheduling radio network temporary identifiers (CS-RNTIs) or SPS cell RNTIs (SPS-C-RNTIs).

Aspect 46: The method of any of aspects 44 or 45, wherein the DCI further includes one or more identifiers of the one or more UEs of the subset including an identifier of the second UE.

Aspect 47: The method of any of aspects 34-46, further comprising receiving a DCI including an indication of an updated SPS resource.

Aspect 48: The method of aspect 47, wherein the DCI further includes a request for the UE to acknowledge the updated SPS resource.

Aspect 49: The method of aspect 48, further comprising receiving radio resource control (RRC) signaling configuring a resource for providing an acknowledgment.

Aspect 50: The method of any of aspects 34-49, further comprising receiving a DCI to release the SPS resource.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 8-10.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method for wireless communications by a node, comprising:
   outputting radio resource control (RRC) signaling configuring a group of user equipments (UEs) with a group semi-persistent scheduling (SPS) radio network temporary identifier (Group-SPS-RNTI) associated with one or more SPS resources and configuring a group identifier (ID) associated with the group of UEs, wherein the group of UEs includes at least a first UE and one or more second UEs;
   outputting a downlink control information (DCI) including the Group-SPS-RNTI and the group ID to activate the one or more SPS resources for the group of UEs; and
   outputting data, for the first UE, in a physical downlink shared channel (PDSCH) to the group of UEs using the one or more SPS resources, wherein the RRC signaling, the DCI, or the PDSCH includes an identifier of the first UE as a target UE for the one or more second UEs to retransmit the data.

2. The method of claim 1, wherein the DCI comprises a common DCI.

3. The method of claim 1, wherein the DCI further includes the identifier of the first UE as the target UE, and wherein at least one of the RRC signaling or the PDSCH does not include the identifier of the first UE as the target UE.

4. The method of claim 1, wherein the PDSCH includes the identifier of the first UE as the target UE, and wherein at least one of the RRC signaling or the DCI does not include the identifier of the first UE as the target UE.

5. The method of claim 1, wherein the RRC signaling configures a first subset of one or more UEs in the group of UEs as the one or more second UEs and with the identifier of the first UE as the target UE, and wherein at least one of the DCI or the PDSCH does not include the identifier of the first UE as the target UE.

6. The method of claim 1, wherein the identifier of the first UE as the target UE comprises a configured scheduling RNTI (CS-RNTI) or a SPS cell RNTI (SPS-C-RNTI) associated with the CS-RNTI.

7. The method of claim 6, wherein the DCI further includes the SPS-C-RNTI as the identifier of the first UE as the target UE.

8. The method of claim 1, further comprising outputting a DCI including an indication of an updated SPS resource.

9. The method of claim 8, wherein:
   the DCI further includes a request for the group of UEs to acknowledge the updated SPS resource; and
   the method further comprises configuring, via RRC signaling, the group of UEs with a resource for providing an acknowledgment.

10. The method of claim 1, further comprising outputting a DCI to release the one or more SPS resources.

11. A method for wireless communications by a first user equipment (UE), comprising:
    receiving radio resource control (RRC) signaling from a node configuring a group semi-persistent scheduling (SPS) radio network temporary identifier (Group-SPS-RNTI) associated with one or more SPS resources for a group of UEs and configuring a group identifier (ID) associated with the group of UEs, wherein the group of UEs includes at least one or more first UEs, including the first UE and a second UE;

receiving a downlink control information (DCI) from the node including the Group-SPS-RNTI and the group ID to activate the one or more SPS resources for the group of UEs;

receiving data transmitted from the node in a physical downlink shared channel (PDSCH) using the one or more SPS resources, wherein the RRC signaling, the DCI, or the PDSCH includes an identifier of the second UE as a target UE for the one or more first UEs to retransmit the data; and retransmitting the data to the second UE.

12. The method of claim 11, wherein the DCI comprises a common DCI.

13. The method of claim 11, wherein the DCI further includes one or more identifiers of one or more UEs in the group of UEs that are intended targets of the data including an identifier of the second UE as the target UE, and wherein at least one of the RRC signaling or the PDSCH does not include the identifier of the second UE as the target UE.

14. The method of claim 11, wherein the PDSCH includes the identifier of the second UE as the target UE, and wherein at least one of the RRC signaling or the DCI does not include the identifier of the second UE as the target UE.

15. The method of claim 11, wherein the identifier of the second UE as the target UE comprises a configured scheduling RNTI CS-RNTIs or a SPS cell RNTI (SPS-C-RNTI) associated with the CS-RNTI.

16. The method of claim 15, wherein the DCI further includes the SPS-C-RNTI as the identifier of the second UE as the target UE.

17. A method for wireless communications by a second user equipment (UE), comprising:

receiving radio resource control (RRC) signaling from a node configuring a group semi-persistent scheduling (SPS) radio network temporary identifier (Group-SPS-RNTI) associated with one or more SPS resources for a group of UEs and configuring a group identifier (ID) associated with the group of UEs, wherein the group of UEs includes the second UE and one or more first UEs;

receiving downlink control information (DCI) comprising a common DCI including the group ID and the Group-SPS-RNTI to activate the one or more SPS resources for the group of UEs;

monitoring the one or more SPS resources for a data transmission from the node; and receiving a retransmission of the data from at least one of the one or more first UEs.

18. An apparatus for wireless communications, comprising:

a memory; and at least one processor coupled with memory, the processor and memory configured to:

output radio resource control (RRC) signaling configuring a group of apparatuses with a group semi-persistent scheduling (SPS) radio network temporary identifier (Group-SPS-RNTI) associated with one or more SPS resources and configuring a group identifier (ID) associated with the group of apparatuses, wherein the group of apparatuses includes at least a first UE and one or more second UEs;

output a downlink control information (DCI) including the Group-SPS-RNTI and the group ID to activate the one or more SPS resources for the group of apparatuses; and output data, for the first UE, in a physical downlink shared channel (PDSCH) to the group of apparatuses using the SPS resource, wherein the RRC signaling, the DCI, or the PDSCH includes an identifier of the first UE as a target UE for the one or more second UEs to retransmit the data.

* * * * *